United States Patent [19]

Danno et al.

[11] Patent Number: 4,705,001
[45] Date of Patent: Nov. 10, 1987

[54] DEVICE FOR CONTROLLING ENGINE AND METHOD THEREOF

[75] Inventors: Yoshiaki Danno; Akira Takahashi; Kazumasa Iida, all of Kyoto, Japan

[73] Assignee: Mitsubishi Jidosha Kogyo Kabushiki Kaisha, Tokyo, Japan

[21] Appl. No.: 5,299

[22] Filed: Dec. 17, 1986

Related U.S. Application Data

[63] Continuation of Ser. No. 711,477, Mar. 13, 1985, abandoned.

[30] Foreign Application Priority Data

Mar. 15, 1984 [JP] Japan .................. 59-50326
Mar. 15, 1984 [JP] Japan .................. 59-50327

[51] Int. Cl.$^4$ .............................. F02P 5/00
[52] U.S. Cl. .................. 123/417; 123/478; 123/339
[58] Field of Search ............ 123/339, 340, 341, 349, 123/395, 480, 488, 478, 417, 350, 352, 361, 571, 376, 391, 403

[56] References Cited

U.S. PATENT DOCUMENTS

| | | | |
|---|---|---|---|
| 3,964,457 | 6/1976 | Coscia | 123/361 |
| 4,157,699 | 6/1979 | Mori | 123/417 |
| 4,188,926 | 2/1980 | Fleischer | 123/361 |
| 4,301,883 | 11/1981 | Collonia | 123/361 |
| 4,354,467 | 10/1982 | Noddings et al. | 123/352 |
| 4,418,673 | 12/1983 | Tominari et al. | 123/478 |
| 4,419,729 | 12/1983 | Krieder | 123/352 |
| 4,450,528 | 5/1984 | Yaegashi et al. | 123/417 |
| 4,450,814 | 5/1984 | Sawomato et al. | 123/478 |
| 4,492,203 | 1/1985 | Yutaka | 123/478 |
| 4,498,443 | 2/1985 | Hasegawa et al. | 123/478 |
| 4,523,561 | 6/1985 | Kosuge | 123/361 |
| 4,527,529 | 7/1985 | Suzuki et al. | 123/478 |

Primary Examiner—Raymond A. Nelli
Attorney, Agent, or Firm—Robert E. Burns; Emmanuel J. Lobato

[57] ABSTRACT

The present invention relates to a field of an internal combustion engine, and particularly to an engine control for controlling fuel supply and idling speed, etc. by using information of a throttle opening degree as information of load of the internal combustion engine. More particularly, the invention is directed to an engine control comprising calibrating a setting error of the throttle sensor as included in the throttle opening degree according to an output from an air flow sensor, and controlling the engine according to a calibrated throttle opening degree.

15 Claims, 8 Drawing Figures

DEVICE FOR CONTROLLING ENGINE AND METHOD THEREOF

This application is a continuation of our application Ser. No. 711,477 filed Mar. 13, 1985 now abandoned.

BACKGROUND OF THE INVENTION (1) Field of the Invention

This invention relates to a device for controlling an engine (internal combustion engine) and a method thereof.

(2) Description of the Prior Art

It has already been proposed to control the rate of fuel supply to an engine or the idling conditions of the engine in accordance with information on the opening degree of its associated throttle (throttle opening degree), which is detected by a throttle sensor constituted of a potentiometer, or the revolution number of the engine.

Although the engine control making use of information on the throttle opening degree has such an advantage as good responsibility, it is accompanied by a disadvantage that accurate control can hardly be attained owing to errors or the like prone to occur upon mounting the throttle sensor.

SUMMARY OF THE INVENTION

It is an object of the present invention to provide an engine control device and control method which is free from the above-mentioned disadvantage, and can avoid the reduction in control reliability due to setting (mounting) errors of the throttle sensor while retaining the advantage of the high-responsibility engine control by information on the throttle opening degree.

According to one aspect of the present invention, there is provided a device for controlling an engine on the basis of the opening degree of its associated throttle valve, comprising:

an air flow sensor for detecting the amount of suction air through an intake passage of the engine;

a throttle sensor for detecting the opening degree of the throttle valve provided in the intake passage;

calibration means for comparing a theoretical opening degree of the throttle valve, which has been estimated theoretically from the amount of suction air detected by the air flow sensor when the engine is under predetermined operational conditions, with the opening degree of the throttle valve detected by the throttle sensor under the same predetermined operational conditions, and in accordance with the results of the comparison, calibrating the opening degree of the throttle valve, which has been detected at a desired point of time, to a correct value; and means for controlling the engine by using the correct value as the first-mentioned opening degree.

According to another aspect of the present invention, there is provided a device for controlling an engine on the basis of the opening degree of its associated throttle valve and the amount of suction air, comprising:

an air flow sensor for detecting the amount of suction air through an intake passage of the engine;

a throttle sensor for detecting the opening degree of the throttle valve provided in the intake passage;

calibration means for comparing a theoretical opening degree of the throttle valve, which has been estimated theoretically from the amount of suction air detected by the air flow sensor when the engine is under predetermined operational conditions, with the opening degree of the throttle valve detected by the throttle sensor under the same predetermined operational conditions, and in accordance with the results of the comparison, calibrating the opening degree of the throttle valve, which has been detected at a desired point of time, to a correct value; and means for controlling the engine by using the correct value as the first-mentioned opening degree when the engine is under specific operational conditions but by using the amount of the suction air when the engine is under operational conditions other than the specific operational conditions.

According to a further aspect of the present invention, there is provided a method for controlling an engine on the basis of the opening degree of its associated throttle, which comprises:

calibrating an opening degree of the throttle valve, which has been detected by a throttle sensor, in accordance with an output from an air flow sensor adapted to detect the amount of suction air through an intake passage of the engine to a correct value; and using the correct value as the first-mentioned opening degree.

Accordingly, the engine control device of the present invention permits calibration of the throttle opening degree even during engine running operation with such a simple structure as described above, and materializes highly accurate engine control in accordance with information on the throttle opening degree.

Furthermore, the engine control method of the present invention permits high-accuracy engine control with less errors while retaining the inherent good responsibility, which the engine control relying upon the throttle opening degree has.

DETAILED DESCRIPTION OF THE PREFERRED EMBODIMENTS

Figure 1:
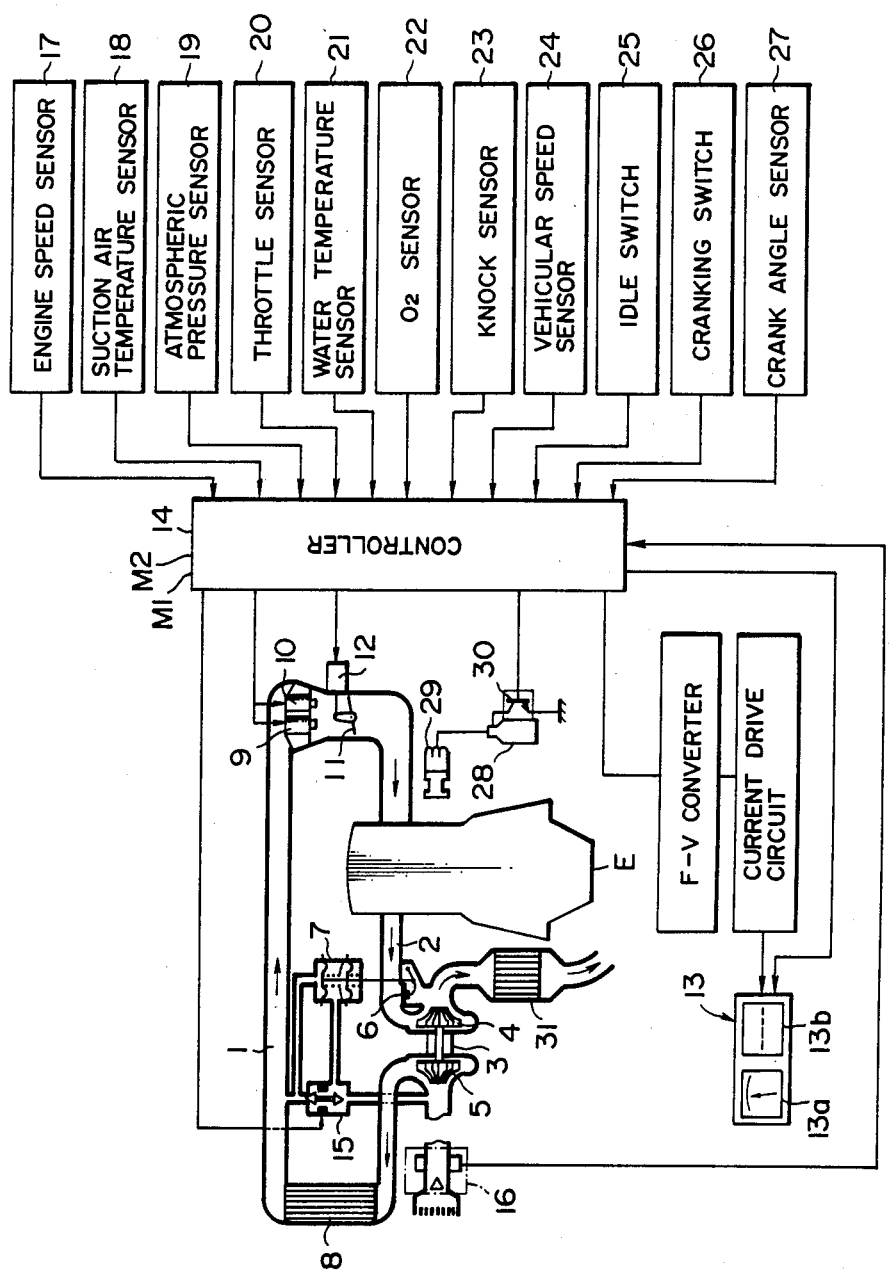
FIG. 1 is a schematic constitutional view of the engine control device according to a first preferred embodiment.

Referring to FIG. 1 which shows a first preferred embodiment of the present invention, an internal combustion engine E (which will be hereinafter referred to simply as an engine E.) such as a gasoline engine suitable for mounting on an automobile is provided with a turbocharger 3. The turbocharger 3 is provided with a turbine 4 interposed in an exhaust passage 2 of the engine E, and with a compressor 5 interposed in an intake passage 1 of the engine E and driven and rotated by the turbine 4.

A bypass passage bypassing a turbine supply portion of the exhaust passage 2 is connected to the exhaust passage 2, and a waste gate valve 6 for opening and closing the bypass passage is provided. The waste gate valve 6 is designed to be opened and closed by a pressure responsive device 7 of dual diaphragm type. In other words, either one of atmospheric pressure or supercharged pressure is selectively supplied to one of the pressure chambers of the pressure responsive device 7 by an electromagnetic selector valve 15 (which includes an unillustrated return spring for a valve member.) thereby to adjust the timing of opening and the like of the waste gate valve 6 and to achieve at least two supercharged pressure characteristics.

There are arranged in order from an upstream side (an air cleaner side) in the intake passage 1 of the engine an air flow sensor 16, the compressor 5 of the turbocharger 3, an intercooler 8, electromagnetic fuel injection valves 9 and 10 (which have different injection capacities.) as an engine controlling section, and a throttle valve 11. On the other hand, there are arranged in order from an upstream side (an engine combustion chamber side) in the exhaust passage 2 of the engine E the turbine 4 of the turbocharger 3, a catalytic converter 31 and a muffler (not shown).

The air flow sensor 16 serves to detect a number of Karman vortices generated by a columnar member provided in the intake passage 1 by means of a supersonic modulation means or in accordance with changes in resistance, thereby detecting the amount of suction air flowing through the intake passage 1. A digital output from the air flow sensor 16 is inputted to a controller 14, wherein it is applied to a half frequency divider, for example, and is then utilized for a process for calibrating the opening degree of the throttle valve 11 (throttle opening degree) which will be hereinafter described.

The air flow sensor 16 is generally said to undergo malfunction because of intake pulsations, etc. under low-speed and high-load conditions of the engine E. However, in the preferred embodiment, as the intercooler 18 is provided downstream of the air flow sensor 16, and the size of an air cleaner region or the like may be suitably adjusted to avoid occurrence of the above-mentioned intake pulsations substantially, the measurement reliability or accuracy of the air flow sensor 16 is believed to have been improved to a significant extent.

Further, there is provided an engine speed sensor 17 which serves to detect the engine speed by detecting information on the engine speed from the primary negative terminal of an ignition coil 28, for example.

There is provided a throttle sensor 20 for detecting throttle opening degrees. A potentiometer is used as the throttle sensor 20.

Furthermore, there are provided a suction air temperature sensor 18 for detecting the temperature of suction air, an atmospheric pressure sensor 19 for detecting the atmospheric pressure, a water temperature sensor 21 for detecting the temperature of an engine coolant, an $O_2$ sensor 22 for detecting the oxygen concentration in exhaust gas, a knock sensor 23 for detecting engine knocking, a vehicular speed sensor 24 for detecting the vehicular speed, an idle switch 25 for detecting engine idling, a cranking switch 26 for detecting engine cranking, and a crank angle sensor 27 for detecting crank angles by a photo-electric conversion means with a distributor 29. Detection signals from these sensors and switches are inputted to the controller 14.

As the detection signals from the suction air temperature sensor 18, atmospheric pressure sensor 19, water temperature sensor 21, throttle sensor 20, $O_2$ sensor 22 and knock sensor 23 are analog signals, they are inputted through an A/D converter to the controller 14. The atmospheric pressure sensor 19 may be incorporated in the controller 14.

There is provided an actuator 12 constituted of a DC motor or the like as the engine controlling section for driving and rotating the throttle valve 11 through a rod or the like, so as to control the engine speed at idling.

The ignition coil 28 is designed in such manner that its primary current is switched on or off by means of a power transistor 30 as a switching transistor.

Figure 2:
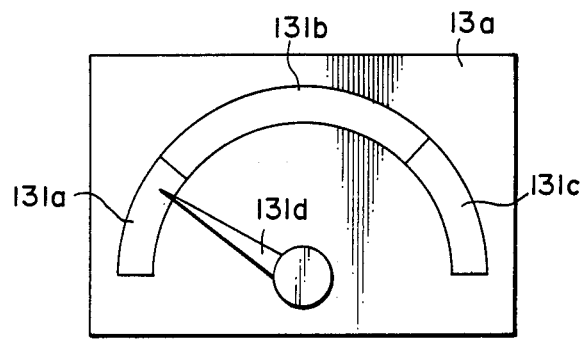
FIG. 2 is an exemplary schematic view of the indicator in FIG. 1.

There is further provided an indicator 13. As shown in FIG. 2, the indicator 13 may take the form of an analog indicator 13a in which a needle 131d indicates one of a vacuum region 131a, supercharged region 131b and over-supercharged region 131c (which is also called a red zone.) when the needle 131d is turned upon receipt of a control signal (current) from the controller 14. Alternatively, the indicator 13 may be composed of a segment indicator 13b having light emission diodes (LED) arrayed in a row for suitably turning on and off these LEDs.

In the case that the indicator 13 includes the analog indicator 13a, the control signal is supplied from the controller 14 through an F-V converter and a current drive circuit to the indicator 13.

The controller 14 is constituted of a CPU (microprocessor), memory (inclusive of RAM, ROM and memory stored in a map), and a suitable I/O interface (e.g., A/C converter). Concretely, the controller 14 functions as a calibration means M1 and a control means M2. In other words, under predetermined operational conditions of the engine E, the calibration means M1 acts to compare a theoretical throttle opening degree $\theta_s$ estimated from the amount of suction air detected by the air flow sensor 16 (which amount is used actually after its conversion to a corresponding value under standard conditions in accordance with the intake air temperature and atmospheric pressure, the same being to be applied hereinafter.), various throttle opening degrees $\theta_s$ being stored in the map in relation to their corresponding intake air amounts, with a detected throttle opening degree $\theta_r$ detected by the throttle sensor 20, to store results of the comparison and then to calibrate the detected throttle opening degree $\theta_r$ in accordance with the results of the comparison to a correct value, thereby obtaining a calibrated throttle opening degree. When the engine E is under specific operational conditions other than the above-mentioned predetermined operational conditions, the control means M2 acts to output, based on information on the calibrated throttle opening degree obtained by the calibration means M1 as a controlling throttle opening degree, an engine control signal to the engine controlling section such as the electromagnetic fuel injection valve 9 or the throttle actuator 12.

As specific means which can make effective use of data calibrated by the calibration means M1, may for example be contemplated a fuel supply control means of such a type that when surging occurs in the suction system during deceleration of the engine E or the air flow sensor 16 is disconnected, the fuel supply control means acts to estimate the amount of suction air from the throttle opening degree and the engine speed, and to output a fuel supply control signal to the electromagnetic fuel injection valve 9 in accordance with the operational conditions of the engine E determined from the estimate amount of suction air (which may also be estimated from the throttle opening degree only.), or an idling feedback control means which acts to output a control signal to the actuator 12 so as to control the engine speed at idling in terms of engine speed (which is called "engine speed feedback control") or alternatively in terms of the throttle opening degree (which is called "position feedback control"). The predetermined engine operational conditions for effecting the calibration by the calibration means M1 are selected from conditions where the operation of the engine is stable enough to estimate the theoretical throttle opening degree from the amount of suction air. For example, an extremely small opening position range of the throttle valve (near an idle position) may be selected. More specifically, the engine E may be considered to be under the predetermined operational conditions provided that the following conditions are met.

(1) The engine speed feedback control has been performed continuously for a predetermined period of time.

(2) The amount of suction air is within a predetermined range.

The controller 14 further functions as a fuel supply control means under normal conditions other than such surging or air flow sensor malfunction as mentioned above. In other words, the fuel supply control means acts to output a fuel supply control signal to the electromagnetic fuel injection valves 9 and 10 in accordance with the operational conditions of the engine E determined from the amount of suction air detected by the air flow sensor 16 and the engine speed detected by the engine speed sensor 17.

Furthermore, the controller 14 functions as a suction pressure indication control means for outputting a signal corresponding to the suction pressure to the indicator 13 in accordance with information on the amount of suction air calibrated by the suction air temperature an the atmospheric pressure and information on the engine speed, an ignition timing control means for outputting an ignition timing control signal to the power transistor 30 in accordance with the operational conditions of the engine E, and a waste gate valve control means for outputting a signal to the electromagnetic selector valve 15 for controlling the pressure responsive device 7 so as to adjust the timing of opening of the waste gate valve 6 or the like for obtaining different supercharged pressure characteristics.

Figure 3:
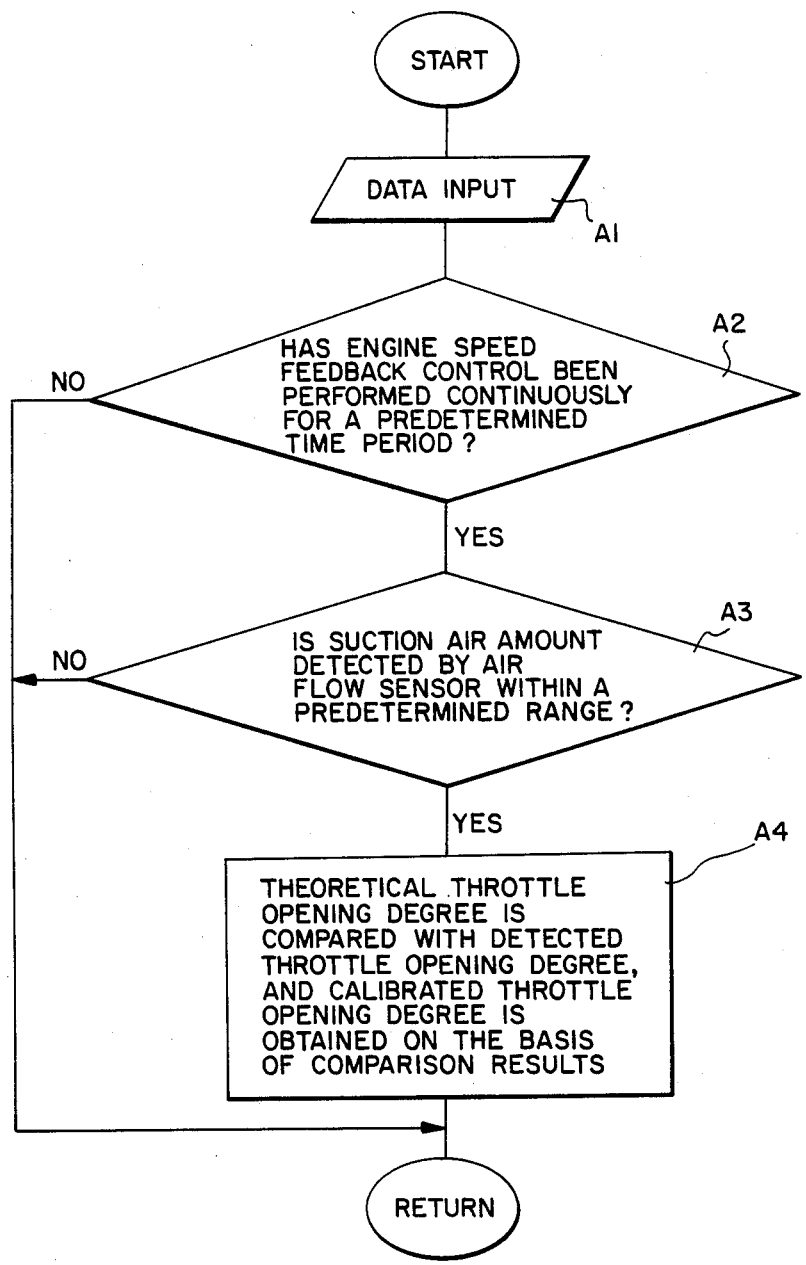

With this constitution, the detected throttle opening degree is calibrated in the following manner. As shown in FIG. 3, in step A1, various data are inputted, and then in steps A2 and A3, it is judged whether or not calibration of the detected throttle opening degree is possible by the calibration means M1. First, in the step A2, it is judge whether or not the engine speed feedback control has been performed continuously for a predetermined period of time. If YES in the step A2, then it is judged in the step A3 whether or not the amount of suction air detected by the air flow sensor 16 is within a predetermined range. If YES in the step A3, it is then judged that calibration of the detected throttle opening degree is possible, and thereafter proceeds to the next step A4. In the step A4, the corresponding theoretical throttle opening degree $\theta_s$ is compared with the detected throttle opening degree $\theta_r$ by the calibration means M1, and results of the comparison, namely, their difference $(\theta_s - \theta_r)$ is stored regarding it as a setting error (mount error) of the throttle sensor 20. The detected value of the throttle opening degree is then calibrated by the difference, whereby a calibrated throttle opening degree is obtained.

Regarding this calibrated throttle opening degree, calibrated values corresponding respectively to all throttle opening degrees may be calibrated on the basis of the above-described setting error in the step A4, followed by their storage. As a further alternative, whenever the engine E is controlled in accordance with information on the throttle opening degree as will be described subsequently, the throttle opening degree detected by the throttle sensor 20 may be calibrated by the above-described stored setting error.

The setting error of the throttle sensor 20 as obtained in the step A4 is suitably stored in the memory of the controller 14. After a predetermined period of time is elapsed, the setting error of the throttle sensor 20 is determined again under the above-mentioned operational conditions of the engine E, and the value of the throttle opening degree detected by the throttle sensor 20 is calibrated by the newly-determined setting error. This is called "learning control". For example, according to the learning control, the newly-determined setting error is regarded as a correct setting error, or one half of the difference between the previously-determined setting error and the newly-determined setting error is added to or subtracted from the previously-determined setting error or the newly-determined setting error to obtain the sum or remainder, which is regarded as a correct setting error.

If NO in the steps A2 and A3, the detected value of throttle opening degree is not calibrated.

Figure 4:
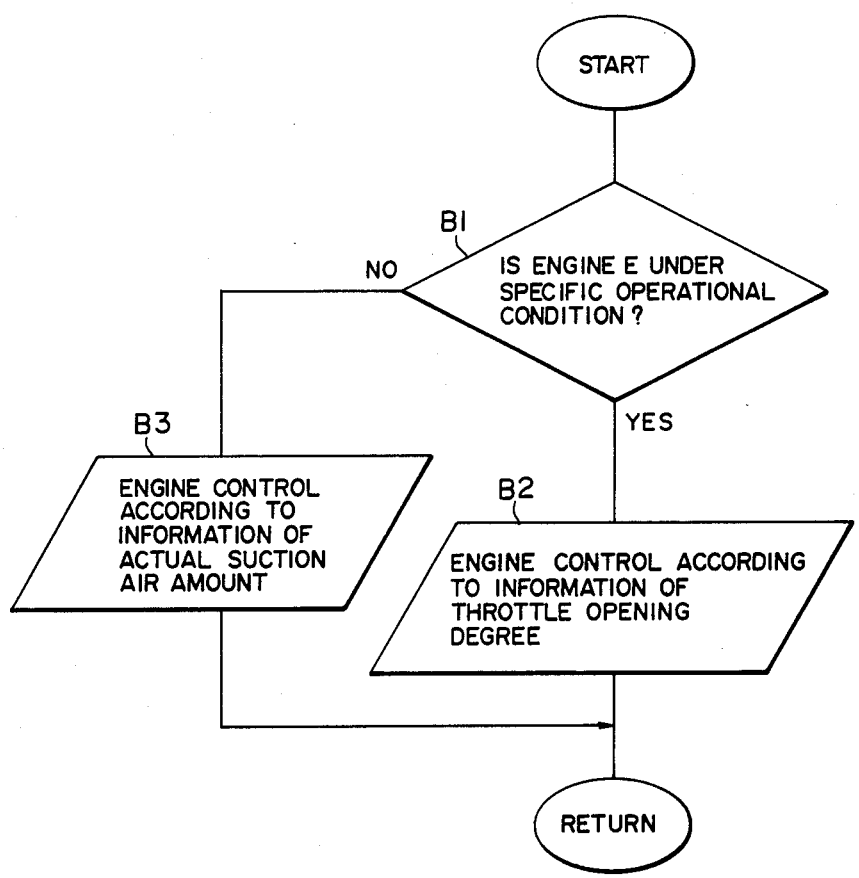
FIGS. 3 and 4 are flow charts of operation of the first embodiment.

Referring next to FIG. 4 which shows an exemplary engine control in the preferred embodiment, first in the step B1, it is judged whether or not the engine E is under specific operational conditions, (e.g., when surging has occured in the suction system upon deceleration or the position feedback control is desired at idling). If YES in the step B1, engine control is effected in step B2 by the control means M2 by using information on the calibrated throttle opening degree, which has been obtained by the calibration means M1, as engine-controlling information.

If NO in the step B1, engine control is effected in the step B3 in accordance with information on the actual amount of suction air by the means for controlling the fuel supply under the normal conditions.

In this manner, the engine control relying upon the throttle opening degree, which is effected under the specific operational conditions of the engine E, can be accurately executed, thereby improving the performance of idle speed control or the fuel control during deceleration for example.

Until the detection of the setting error of the throttle sensor 20 (namely, the calibration of the throttle opening degree) is completed, the engine control making use of the throttle opening degree is not effected even when the engine E is under the above-mentioned specific operational conditions. If the engine control is forcedly effected in this case, its accuracy is deteriorated conversely.

Further, the control device of the preferred embodiment may also be used for a non-turbo engine.

Figure 5:
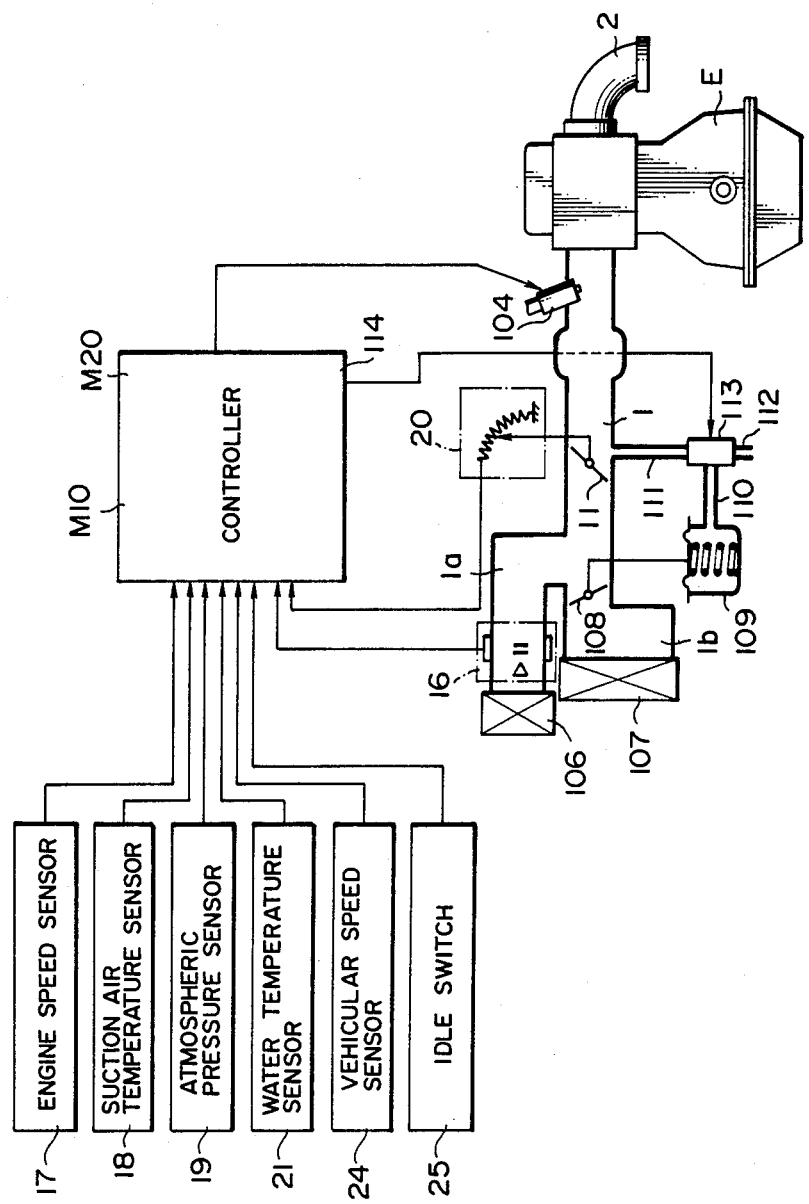
FIG. 5 is a schematic constitutional view of the engine control method according to a second preferred embodiment.

Referring to FIG. 5 which shows a second preferred embodiment of the present invention, a throttle valve 11 is interposed in the intake passage 1 of the internal combustion engine E (which will be hereinafter referred to simply as an engine E.) such as a gasoline engine suitable for mounting on an automobile. The opening degree of the throttle valve 11 (throttle opening degree) is designed to be detected by a throttle sensor 20 constituted of a potentiometer, and each output from the throttle sensor 20 is supplied to a confroller 114.

The intake passage 1 of the engine E is divided into two parts as shown by reference numerals 1a and 1b on the upstream side of a throttle valve mount portion, and air cleaners 106 and 107 are provided respectively at inlet portions of the intake passage 1a and 1b.

An air flow sensor 16 is provided in the intake passage 1a. The air flow sensor 16 serves to detect a number of Karman vortices generated by a columnar member provided in the intake passage 1a by means of a supersonic modulation means or in accordance with changes in resistance, thereby detecting the amount of suction air through the intake passage 1. A digital output from the air flow sensor 16 is inputted to the controller 114, wherein it is applied to a half frequency divider for example, and is then utilized for a process for calibrating the throttle opening degree which will be hereinafter described.

The air flow sensor 16 is generally said to undergo malfunction because of intake pulsations, etc. under low-speed and high-load conditions of the engine E. However, similar to the first preferred embodiment, as an intercooler (not shown) is provided downstream of the air flow sensor 16, and the size of the region of the air cleaner 106 or the like may be suitably adjusted to eliminate the above-mentioned intake pulsations substantially, whereby the measurement reliability or accuracy of the air flow sensor 16 is believed to have been improved to a significant extent.

Further, there is provided an engine speed sensor 17 which serves to detect the engine speed by detecting information on the engine speed from the primary negative terminal of an ignition coil for example.

There are further provided a suction air temperature sensor 18 for detecting the temperature of suction air, an atmospheric pressure sensor 19 for detecting the atmospheric pressure, a water temperature sensor 21 for detecting the temperature of an engine coolant, a vehicular speed sensor 24 for detecting the vehicular speed, and an idle switch 25 for detecting engine idling. Furthermore, similar to the first preferred embodiment, but not shwon, there are provided an 0$_2$ sensor for detecting the oxygen concentration in exhaust gas, a knock sensor for detecting engine knocking, a cranking switch for detecting engine cranking, and a crank angle sensor for detecting crank angles by a photo-electric conversion means with a distributor. Detection signals from these sensors and switches are imputted to the controller 114.

As the detection signals from the suction air temperature sensor 18, atmospheric pressure sensor 19, water temperature sensor 21, throttle sensor 20, 0$_2$ sensor, and knock sensor are analog signals, they are inputted through an A/D converter to the controller 114. The atmospheric pressure sensor 19 may be incorporated in the controlled 114.

There is provided an actuator (not shown) constituted of a DC motor or the like as the engine controlling section for driving and rotating the throttle valve 11 through a rod or the like, so as to control the engine speed at idling.

There are further provided electromagnetic fuel injection valves 104 as engine controlling sections for individual cylinders at an intake manifold region.

A selector valve 108 is interposed in the vicinity of the branched portion of the intake passages 1a and 1b. The selector valve 108 is opened and closed by a diaphragm type pressure responsive device 109 through an interlocking means such as a rod.

A control passage 110 is connected to the pressure chamber of the pressure responsive device 109. Suction vacuum from a vacuum passage 111 (which vacuum is induced from the downstream side of a throttle valve mount portion in the intake passage 1) and the atmospheric pressure from an atmospheric air passage 112 are applied through a control selector valve 113 adapted to be switched upon receipt of a control signal from the controller 114 to the control passage 110.

In other words, when the selector valve 113 receives a control signal from the controller 114 and is switched to the side of the vacuum passage 111, the suction vacuum is applied to the control passage 110 to attract the rod or the like and accordingly the selector valve 108 closes the intake passage 1b. On the other hand, when the selector valve 113 receives another control signal from the controller 114 and is switched to the side of atmospheric air passage 112, The atmospheric pressure is applied to the control passage 110 to push the rod or the like with the aid of a return spring in the pressure responsive device 109, and accordingly the selector valve 108 opens the intake passage 1b.

While the intake passage 1b is closed, the suction of air is induced through the intake passage 1a. While the intake passage 1b is open on the other hand, the suction of air is induced mostly through the intake passage 1b because of the large resistance to the suction of air through the intake passage 1a.

The controller 114 is constituted of a CPU (microprocessor), memory (inclusive of ROM, RAM and memory stored in a map) and a suitable I/O interface (e.g., A/D converter). Concretely, the controller 114 functions as a calibration means M10 and a control means M20. In other words, under predetermined operational conditions of the engine E, the calibration means M10 acts to compare a theoretical throttle opening degree $\theta_s$ estimated theoretically from the amount of suction air detected by the air flow sensor 16 (various opening degrees $\theta_s$ are stored in the map in relation to their corresponding amounts of suction air) with a detected throttle opening degree $\theta_r$ detected by the throttle sensor 20, to store results of the comparison and then to calibrate the detected throttle opening degree $\theta_r$ in accordance with the results of the comparison to a corrected value, thereby obtaining a calibrated throttle opening degree. When the engine E is under specific operational conditions other than the above-mentioned predetermined operational conditions, the control means M20 acts to output, based on information on the throttle opening degree obtained by the calibration means M10 as a controlling throttle opening degree, an engine control signal to the engine controlling section such as the electromagnetic fuel injection valves 104 or the actuator for driving the throttle valve 11 at idling.

Similar to the first preferred embodiment, as specific means which make effective use of data calibrated by the calibration means M10, may for example be contemplated a fuel supply control means of such a type that the fuel supply control means acts to output a fuel supply control signal to the electromagnetic fuel injection valves 104 in accordance with operational conditions of the engine E detected from the throttle opening degree and the engine speed; or an idling feedback control means which acts to output a control signal to the actuator so as to control the engine speed at idling in terms of engine speed (which is called "engine speed feedback control") or alternatively in terms of the throttle opening degree (which is called "position feedback control").

The predetermined engine operational conditions for effecting the calibration by the calibration means M10 may be chosen in the same manner as in the first preferred embodiment. Namely, they are selected from conditions under which the operation of the engine is stable enough to estimate the theoretical throttle opening degree from the amount of suction air. For example, an extremely small opening position range of the throttle valve (near an idle position) may be selected, where the following conditions are satisfied.

(1) The engine speed feedback control has been performed continuously for a predetermined period of time.

(2) The amount of suction air is within a predetermined range.

The controller 114 further functions as an ignition timing control means for outputting an ignition timing control signal in accordance with operational conditions of the engine E.

Figure 6:
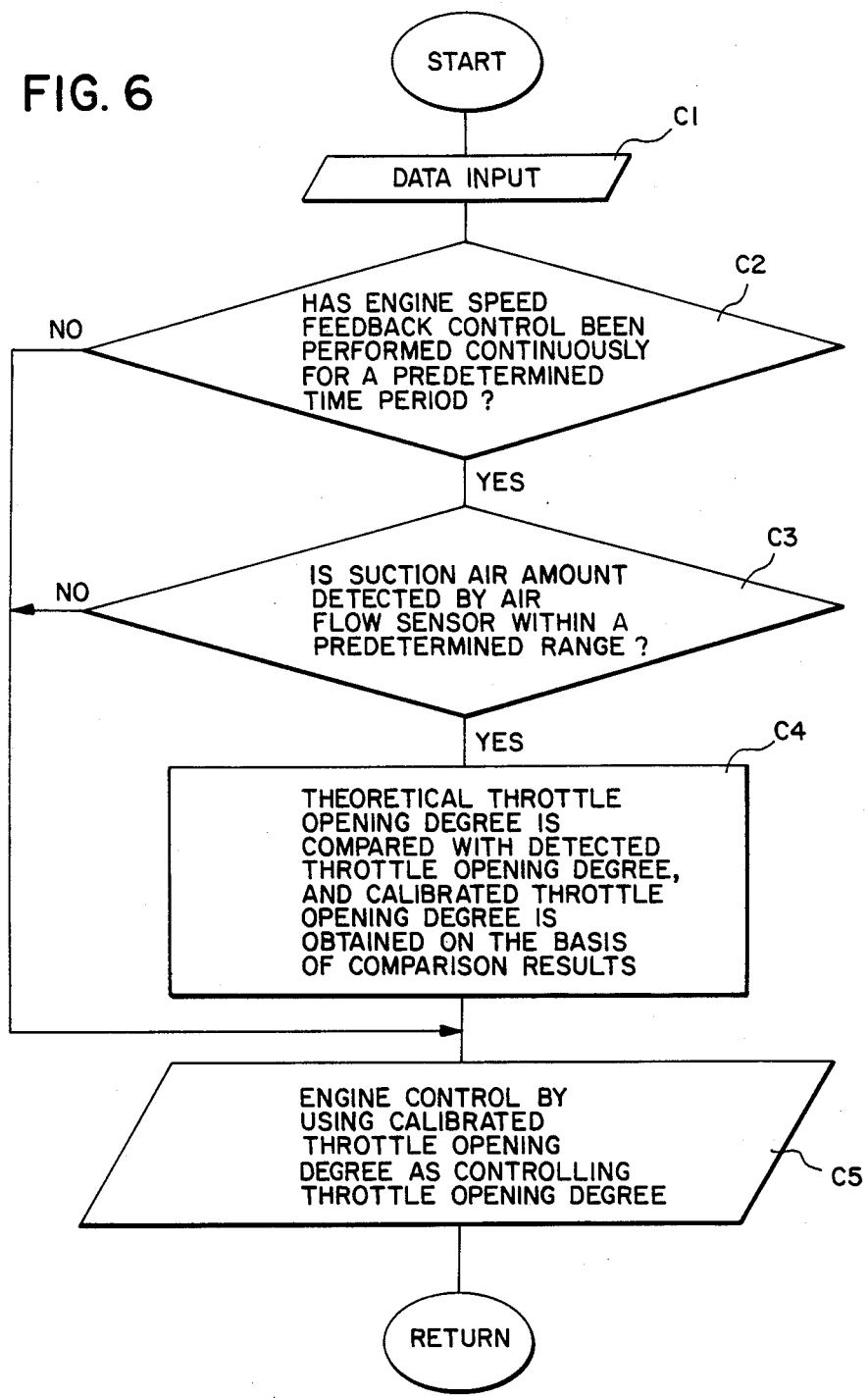
FIG. 6 is a flow chart of operation of the second embodiment.

With this constitution, calibration of the detected throttle opening degree and engine control after the calibration are effected in the following manner. As shown in Fig. 6, in step C1, various data are inputted, and then in steps C2 and C3, it is judged whether or not calibration of the throttle opening degree is possible by the calibration means M10. First, in the step C2, it is judged whether or not the engine speed feedback control has been performed continuously for a predetermined period of time. If YES in the step C2, then it is judged in the step C3 whether nor not the amount of suction air detected by the air flow sensor 16 is within a predetermined range. If YES in the step C3, then it is judged that the calibration of the detected throttle opening degree is possible. At this time, the control signal is outputted from the controller 114 to switch the selector valve 113 to the side of the vacuum passage 111, and accordingly the selector valve 108 closes the intake passage 1b. Suction of air is thus induced through the intake passage 1a having the air flow sensor 16, resulting in an increase to the output value of the air flow sensor 16.

In the next step C4, the theoretical throttle opening degree $\theta_s$ is compared with the detected throttle opening degree $\theta_r$ by the calibration means M10, and results of the comparison, namely, their difference $(\theta_s - \theta_r)$ is stored regarding it as a setting error (mount error) of the throttle sensor 20. The detected value of the throttle opening degree is then calibrated by the difference, whereby calibrated throttle opening degree is obtained.

The setting error of the throttle sensor 20 as obtained in the step C4 is suitably stored in the memory of the controller 114.

After the detected throttle opening degree is calibrated in the above-mentioned manner, another control signal is outputted from the controller 114 to switch the selector valve 113 to the side of the atmospheric air passage 112, and accordingly the selector valve 108 opens the intake passage 1b. Thus, suction of air is induced through the intake passage 1b which gives smaller resistance to the air to be sucked.

Then, in step C5, an engine control such as the fuel supply control and the idling position feedback control is effected by the control means M20 by using the calibrated throttle opening degree, which has been obtained in the above-described manner, as a controlling throttle opening degree.

After a predetermined period of time is elapsed, the selector valve 108 is switched as required under the above-mentioned operational conditions of the engine E to determine the setting error of the throttle sensor 20 again. Then, the value of the detected throttle opening degree is calibrated by the newly-determined setting error. This is called "learning control", which is effected in a manner similar to that in the first preferred embodiment.

If No in the steps C2 and C3, the detected value of throttle opening degree is not calibrated, and the engine control is effected in accordance with the throttle opening degree calibrated before.

In this manner, the engine control relying upon the throttle opening degree can be accurately executed during a normal control without increasing the resistance to suction air and hence lowering the output, thereby improving the performance of idle speed control or the fuel control during deceleration for example.

Further, the method of the above-described embodiment may also be applied when the fuel supply control is effected mainly on the basis of information on the amount of suction air and the engine control making use of information on the throttle opening degree is effected in preference to the control relying upon information on the amount of suction air, for example, upon occurrence of surging in the suction system during deceleration. The reliability of the engine control is also enhanced in this case.

Figure 7:
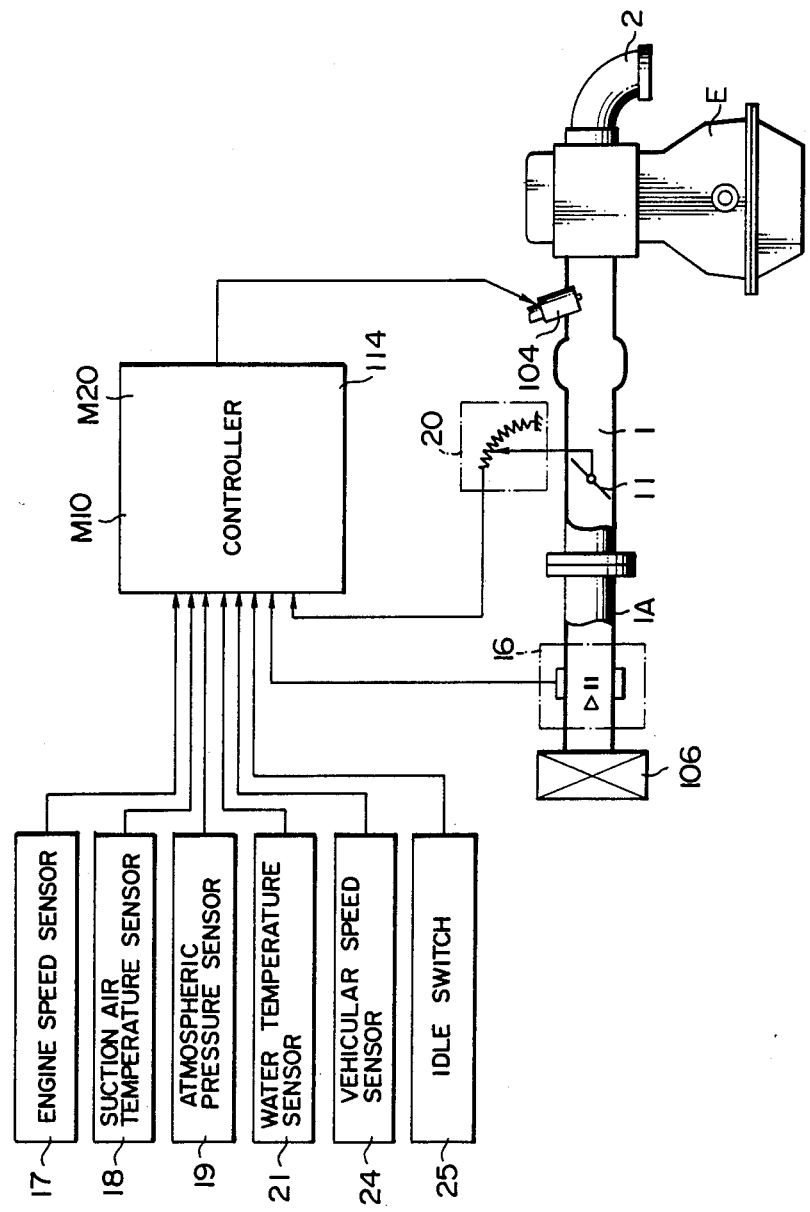
FIG. 7 is a schematic constitutional view of the engine control method according to a third embodiment, wherein calibration of the throttle opening degree is effected.
Figure 8:
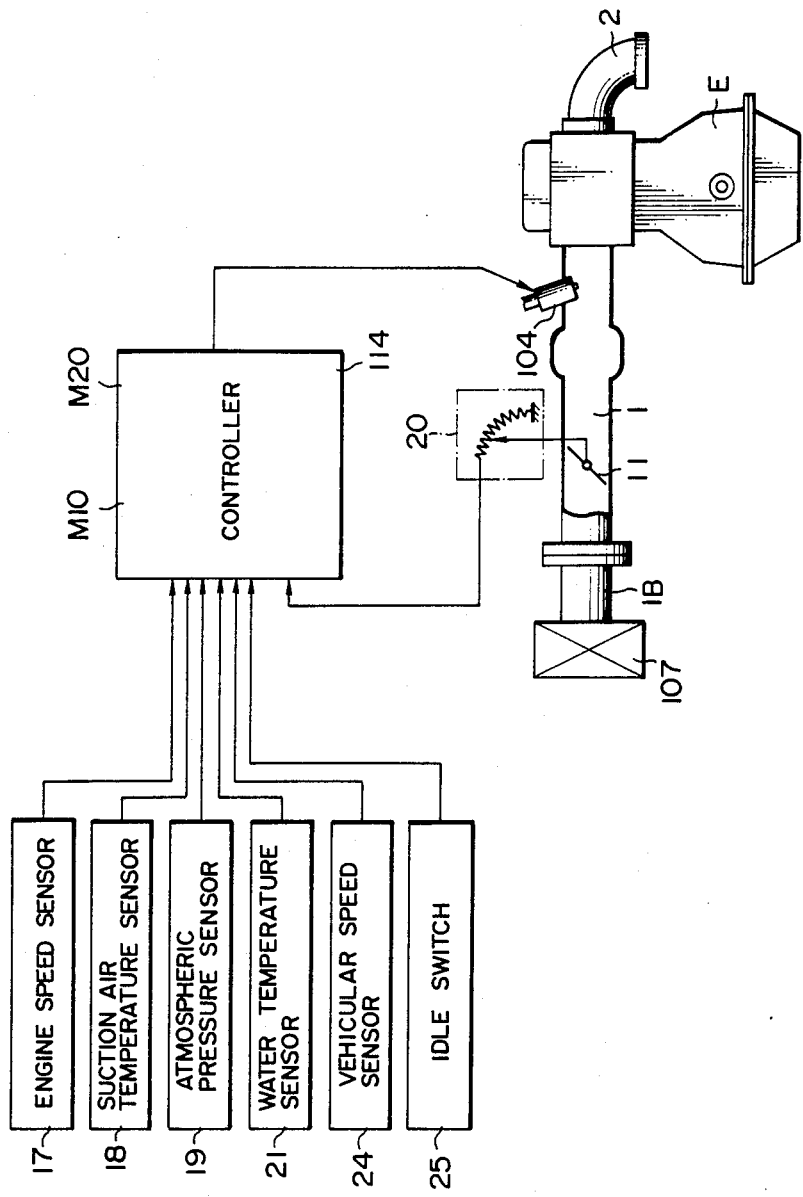
FIG. 8 is a schematic constitutional view similar to FIG. 7, wherein the engine control is effected in accordance with the calibrated throttle opening degree after calibration of the throttle opening degree.

Referring next to FIGS. 7 and 8 which show a third preferred embodiment, it is designed that an intake passage member 1A having the air flow sensor 16 may be provided in the intake passage 1 of the engine E, or that an intake passage member 1B with no air flow sensor 16 may be provided in the intake passage 1. In other words, upon shipping and servicing, the intake passage member 1A having the air flow sensor 16 is attached as shown in FIG. 7 to calibrate throttle opening degrees in accordance with their corresponding outputs from the air flow sensor 16. During normal use, it is substituted by the intake passage member 1B with no air flow sensor 16 as shown in FIG. 8. After the substitution, the engine control is effected based on the calibrated throttle opening degree in the same manner as in the previous embodiments.

The above calibration and storage of calibrated data may be effected substantially under the same conditions in the same manner as in the preceding embodiments.

As is described above, according to the third preferred embodiment, it is possible to achieve an engine control with high response, less error and high accuracy as in the preceding embodiments. In addition, as the costly air flow sensor 16 is not normally mounted but is used as service tool, it is possible to achieve a substantial cost reduction. Further, the layout is not limited for mounting the air flow sensor.

Further, the method of the preferred embodiment may also be applied to turbo engines.

In the above preferred embodiments, each calibrated throttle opening degree is obtained from its corresponding theoretical throttle opening degree $\theta_s$ and detected throttle opening degree $\theta_r$ by means of the calibration means M1 or M10 when the engine speed feedback control has been performed continuously for a predetermined period of time and the amount of suction air detected by the air flow sensor 16 is within a predetermined range (during idling operations). However, the calibration of the detected throttle opening degree may be effected under operational conditions other than the idling operation. In this case, after various operation parameters such as throttle opening degree and throttle opening/closing speed are changed to predetermined extents, the calibrated throttle opening degree is obtained from the detected throttle opening degree $\theta_r$ and its corresponding throttle opening degree $\theta_s$.

In the above-mentioned preferred embodiments, it is not absolutely required to correct each amount of suction air in accordance with its temperature and the atmospheric pressure.

What is claimed is:

1. A device for controlling an internal combustion engine having an air intake passage and a throttle valve provided in said intake passage on the basis of the opening degree of said throttle valve, and air flow through said intake passage comprising:
    an air flow sensor for detecting the amount of suction air flowing through said intake passage of the engine:
    a throttle sensor for detecting the opening degree of said throttle valve provided in the intake passage;
    calibration means for calibrating the opening degree of said throttle valve when the engine is running under predetermined operational conditions, said calibration means comprising:
    a first means for estimating a theoretical opening degree of the throttle valve from the amount of air flow of suction air sensed by said air flow sensor,
    a second means for comparing said theoretical opening degree of the throttle valve estimated by said first means with the detected opening degree of the throttle valve detected by said throttle sensor, and
    a third means for calibrating the detected opening degree of the throttle valve according to the result of comparison by said second means to obtain thereby a calibrated value of the opening degree of the throttle valve, and
    control means for controlling the engine according to said calibrated value of the opening degree of said throttle valve.

2. The device as claimed in claim 1, wherein said predetermined operational conditions of the engine are operational conditions stable enough to estimate the theoretical opening degree of the throttle valve from the amount of the suction air detected by said air flow sensor.

3. The device as claimed in claim 2, wherein the stable operational conditions meet conditions for an idling operation.

4. The device as claimed in claim 1, wherein predetermined operational conditions of the engine meet such conditions that at least the amount of the suction air falls within a preset desired range.

5. The device as claimed in claim 1, further comprising means for correcting the amount of the suction air, which has been detected by the air flow sensor, in accordance with the temperature of the suction air and the atmospheric pressure.

6. The device as claimed in claim 1, wherein the calibrated value of the opening degree of the throttle valve is obtained by adding as a setting error the difference between the theoretical opening degree of the throttle valve and the detected opening degree of the throttle valve, which has been detected under the same predetermined operational conditions, to the detected opening degree of the throttle valve detected at substantially the same desired point of time.

7. A device for controlling an internal combustion engine having an air intake passage and a throttle valve provided in said intake passage on the basis of the opening degree of said throttle valve and the amount of suction air flowing through said intake passage, comprising;
    an air flow sensor for detecting the amount of suction air flowing through said intake passage of the engine;
    a throttle sensor for detecting the opening degree of said throttle valve provided in the intake passage;
    calibration means for calibrating the opening degree of said throttle valve when the engine is under predetermined operational conditions, said calibration means comprising;
    a first means for estimating a theoretical opening degree of the throttle valve from the amount of suction air which has been detected by said air flow sensor,
    a second means for comparing the theoretical opening degree of the throttle valve estimated by said first means with the detected opening degree of the throttle valve detected by said throttle sensor, and
    a third means for calibrating the detected opening degree of the throttle valve according to the result of comparison by said second means to obtain thereby a calibrated value of the opening degree of the throttle valve,
    a first control means for controlling the engine according to said calibrated value of the opening degree of the throttle valve when the engine is under specific operational conditions and
    a second control means for controlling the engine according to the amount of the suction air detected by said air flow sensor when the engine is under operational conditions other than said specific operational conditions.

8. The device as claimed in claim 7, wherein the specific operational conditions are encountered when the air flow sensor is out of order.

9. The device as claimed in claim 7, wherein the specific operational conditions are encountered upon deceleration of the engine during which surging tends to occur in the intake passage of the engine.

10. The device as claimed in claim 7, wherein the specific operational conditions are idling conditions under which the idling speed is supposed to be controlled on the basis of information relating to the opening degree of the throttle valve.

11. A method for controlling an internal combustion engine having an air intake passage, a throttle valve provided in said intake passage, an air flow sensor for detecting the amount of suction air flowing through said intake passage and a throttle sensor for detecting the opening degree of said throttle valve on the basis of the opening degree of said throttle valve and air flow through said intake passage which comprises the steps of:
  (1) detecting the amount of suction air by said air flow sensor,
  (2) estimating the theoretical opening degree of the throttle valve from the detected amount of suction air,
  (3) comparing the theoretical opening degree of the throttle valve thus obtained with a detected opening degree of the throttle valve detected by said throttle sensor,
  (4) calibrating the detected opening degree of the throttle valve according to the result of said comparison, to obtain a calibrated value of the opening degree of the throttle valve, and
  (5) controlling the engine according to the calibrated value of the opening degree of the throttle valve obtained in step (4).

12. The method as claimed in claim 11, wherein said air intake passage upstream of said throttle valve is divided into two branches, with said air flow sensor in a first branch and no air flow sensor in a second branch and wherein the opening degree of the throttle valve is calibrated in accordance with the output from the air flow sensor arranged in said first branch of the intake passage of the engine, suction air is then introduced through said second branch of the intake passage and the calibrated value of the opening degree of the throttle valve is used in control of said engine.

13. The method as claimed in claim 12, wherein a selector valve is provided so as to permit selective introduction of suction air through at least either one of said branches of the intake passage.

14. The method as claimed in claim 13, wherein the selector valve is selectively opened and closed by a pressure responsive device.

15. The method as claimed in claim 11, wherein an intake passage member equipped with the air flow sensor is removably connected to the intake passage of the engine, the opening degree of the throttle valve is calibrated to a calibrated value in accordance with the output from the air flow sensor, said intake passage member is removed, and the calibrated value of the opening degree of the throttle valve is then used in control of the engine.

* * * * *